US006251318B1

(12) United States Patent
Arentsen et al.

(10) Patent No.: US 6,251,318 B1
(45) Date of Patent: Jun. 26, 2001

(54) PROCESS AND APPARATUS FOR MANUFACTURING BIODEGRADABLE PRODUCTS

(75) Inventors: Johan Hendrik Arentsen, Lochem; Jan Wietze Huisman, Bellingwolde, both of (NL)

(73) Assignee: Vertis B.V. (NL)

( * ) Notice: Subject to any disclaimer, the term of this patent is extended or adjusted under 35 U.S.C. 154(b) by 0 days.

(21) Appl. No.: 08/930,890

(22) PCT Filed: Apr. 1, 1996

(86) PCT No.: PCT/NL96/00136

§ 371 Date: Dec. 9, 1997

§ 102(e) Date: Dec. 9, 1997

(87) PCT Pub. No.: WO96/30186

PCT Pub. Date: Oct. 3, 1996

(30) Foreign Application Priority Data

Mar. 31, 1995 (NL) ........................................ 9500632

(51) Int. Cl.[7] ........................ B29C 44/06; B29C 44/24; B29C 44/34
(52) U.S. Cl. ........................ 264/45.5; 264/53; 425/4 C; 425/4 R; 425/461; 425/463; 425/549
(58) Field of Search ..................... 425/547, 461, 425/4 R, 549, 550, 4 C, 325, 463; 264/51, 53, 45.5

(56) References Cited

U.S. PATENT DOCUMENTS

| | | | |
|---|---|---|---|
| 4,093,693 | * | 6/1978 | Lemelson ........................ 264/173.16 |
| 4,399,086 | * | 8/1983 | Walter .................................. 425/325 |
| 5,102,597 | * | 4/1992 | Roe et al. ............................. 264/126 |
| 5,160,674 | * | 11/1992 | Colton et al. ........................... 264/50 |
| 5,186,990 | | 2/1993 | Starcevich . |
| 5,308,879 | * | 5/1994 | Akamatu et al. .................... 521/84.1 |
| 5,413,855 | * | 5/1995 | Kolaska et al. .................... 428/320.2 |

FOREIGN PATENT DOCUMENTS

| | | |
|---|---|---|
| 0304401 | 2/1989 | (EP) . |
| 0400531 | 12/1990 | (EP) . |
| 0512589 | 11/1992 | (EP) . |
| 0587078 | 3/1994 | (EP) . |
| 0634261 | 1/1995 | (EP) . |
| WO 92/08759 | 5/1992 | (WO) . |
| WO 92/13004 | 8/1992 | (WO) . |
| WO 95/04104 | 2/1995 | (WO) . |

\* cited by examiner

*Primary Examiner*—Allan R. Kuhns
(74) *Attorney, Agent, or Firm*—Michaelson & Wallace; Peter L. Michaelson

(57) ABSTRACT

A method for manufacturing biodegradable products with a blown foamy structure, wherein a mass comprising at least natural polymers such as starch is passed under pressure into or through a mould and the mass is heated in the mould in a manner such as to give rise to at least cross-linking of natural polymers, while the mass prior to the introduction into the mould has a temperature which is below the gelatinization temperature and in the mould is brought at least to the baking temperature.

24 Claims, 3 Drawing Sheets

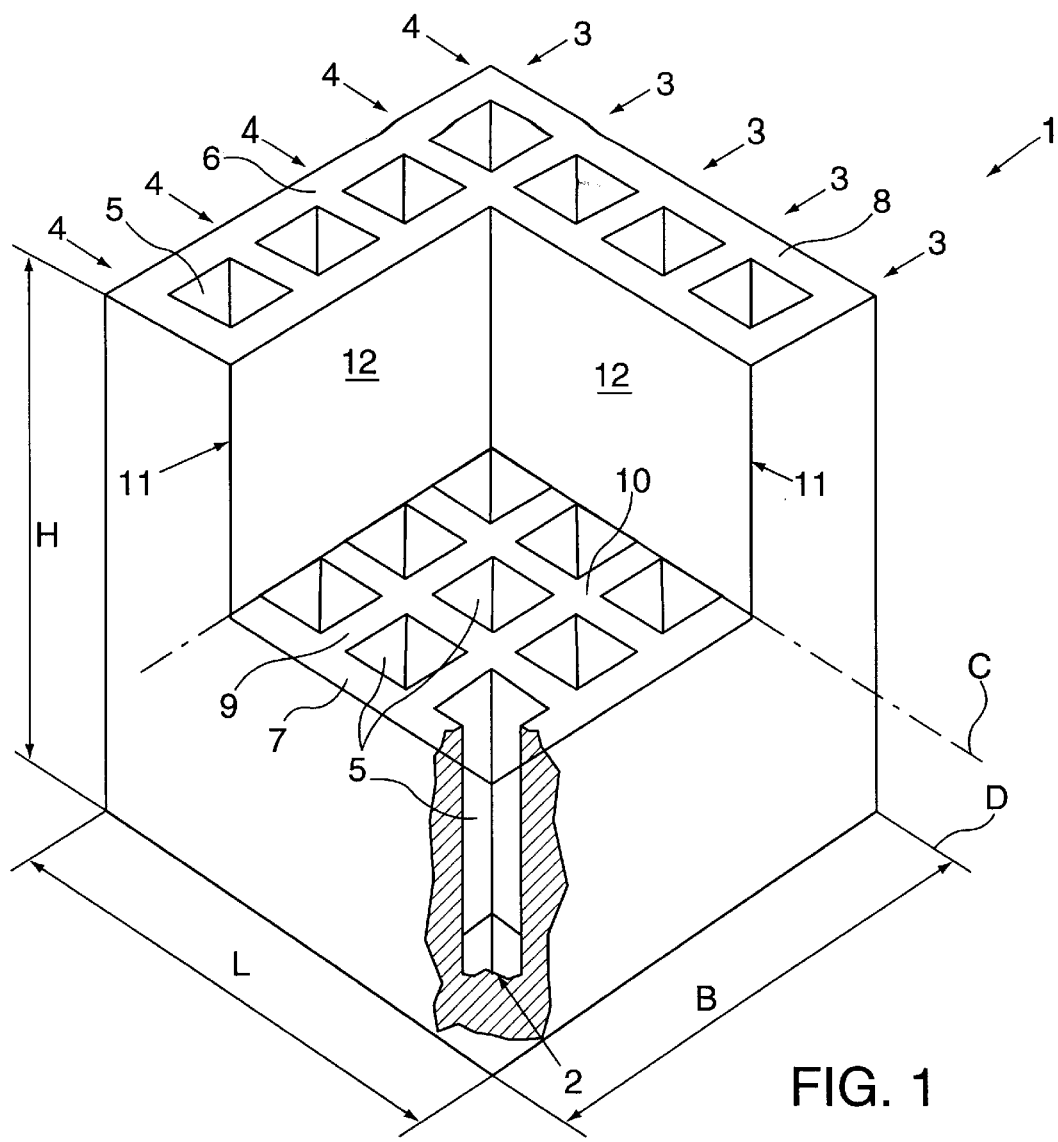
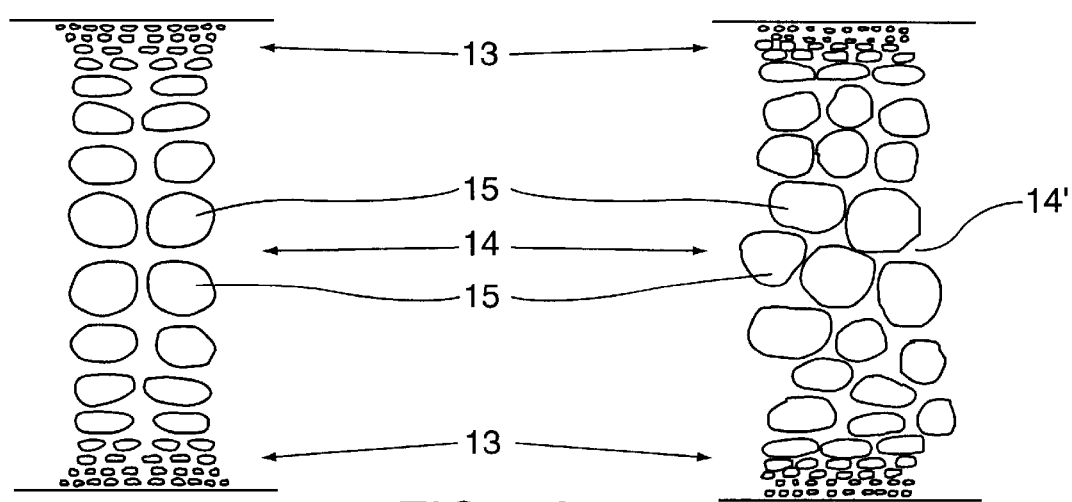
FIG. 1
FIG. 1A

PROCESS AND APPARATUS FOR MANUFACTURING BIODEGRADABLE PRODUCTS

BACKGROUND OF THE INVENTION

The invention relates to a method for manufacturing biodegradable products, to an apparatus which can be used therefor and to products obtainable according to this method. The products to be manufactured according to the invention have a foamy structure. More particularly, the foamy material always comprises at least three parts: two relatively dense layers on the outside, which as it were, form a skin, and between them a foam structure as core. The dense layers are firm and strong and consist of substantially closed, small cells. The foam structure of the core is generally open, which means that the cells have burst to allow the gases evolving during the manufacture, for instance water vapor or carbon dioxide gas, to escape. The cells generally have a firm and solid cell wall due to the relatively high pressure and temperature during the process.

In this description, "gelatinization" is understood to mean a change of a natural polymer from a slightly or completely loose granular or comparable granulate form into a cohesive form which may or may not be dry and/or foamed, in which stretched polymers are present which are mutually bonded to a limited extent, if at all. That is to say, a transition occurs from a solid substance, a colloidal solution or suspension to a more homogeneous fluid mass. Depending on the polymers used, "gelatinization" should therefore be understood to include, for instance, gelling, gellating and the like.

In foamed products where only gelatinization occurs, as a result of gas evolution, bubbles are formed in the mass to be foamed, substantially after gelatinization. This process occurs at relatively low temperatures and pressures. Over the entire cross section, such products have approximately the same structure of relatively small cells with walls of substantially uncross-linked natural polymers.

In this description, "baking" is understood to mean a method in which both gelatinization and cross-linking occur, at relatively high temperature and/or pressure. As a result, the formation of gas arises relatively soon, so that bubbles are already formed prior to or during gelatinization. As a result of inter alia the high pressure adjacent strongly heated parts, the polymers cross-link quickly when using a mold or like baking form with a temperature at or above the baking temperature.

These baked products have a core with relatively large cells, enclosed between skin parts with relatively small cells. The cell walls have a relatively high density and the natural polymers included therein are cross-linked to a high extent, which means that they have entered into mutual chain bonds. Such a baked product therefore has a sandwich-like structure.

International patent application 91/12186 discloses a method for manufacturing biodegradable products by heating in a baking mold a batter which comprises at least natural polymers in the form of starch or derivatives thereof. The batter is introduced into an open platen set, for instance, a wafer iron, whereafter the platen set is closed and the batter is "baked". This results in a thin-walled product which is biodegradable and yet firm and is relatively well resistant to moisture, at least as long as the skin of the product is not damaged. The product is ready immediately and so requires no post-treatment. Owing to the heating to relatively high temperatures, a structure of blown cells and cross-linked starch is created in the product. The products are relatively cheap to manufacture, have good storing properties under different conditions, are light and convenient in use and, owing to their biodegradability, are environment-friendly.

A disadvantage using of platen sets is that the batter is introduced into an open mold which is subsequently closed and, for instance, is passed through a continuous oven, where it is heated, for instance by gas burners. Energetically speaking, this is not very efficient and moreover the temperature in the baking mold is not properly controllable and may vary considerably during the baking process, which is disadvantageous to the quality of the products. Moreover, the products which are obtained according to this method are not particularly dimensionally stable and allow no or only very slight differences in wall thickness, because otherwise no homogeneous structure can be obtained. A further disadvantage of this method is that the introduction of the batter and the removal of the product is very laborious and will often lead to failure in the production. Moreover, with this method no products can be manufactured that are non-withdrawable, so that the molding freedom is limited.

European patent application 0 512 589 discloses a method for making thin-walled biodegradable products, in which platen sets are likewise used. In this known method, a starch-containing dough is introduced into an open mold cavity in one of the platens, whereafter the platen set is closed and is subsequently heated to a temperature at which only gelatinization occurs but at which the dough is not "baked". The temperature is therefore kept relatively low with respect to the previously described method. With this method, products are obtained which are directly ready for use, that is, they do not require any post-treatment. It is true of the products obtained by this procedure too that they have little dimensional stability and permit no, or only very slight, differences in wall thickness in order to preserve a homogeneous structure. Since the products are not "baked", they are less stiff and exhibit relatively poor resistance to, for instance, water and varying temperature conditions. Moreover, it is true of this method too that filling the platen sets and removing the products is cumbersome and time-consuming, that the products can easily be damaged when being removed and cannot be non-withdrawable, so that the freedom in the molding design is limited.

International patent application 93/08014 discloses a method for manufacturing biodegradable products, in which the products are manufactured by extrusion of a mixture comprising at least starch or derivatives thereof. In this method, a dry, crude starch with less than 30% water is mixed with mild acid, which mixture is stirred with a carbonate which, through reaction with the acid, can give rise to $CO_2$ gas. This mixture is introduced into an extrusion tank and mixed with water, while being pressurized and heated to such an extent as to give rise to gelatinization of the starch. In the extrusion tank the acid is reacted with the gelatinized starch, in such a manner that the average molecular weight thereof decreases and the uniform bonds of the starch chains are broken, while moreover, through reaction with the carbonate, $CO_2$ gas is produced for blowing up the modified starch. The thus obtained mixture of blown starch with altered (micro) structure is thereafter forced through an extrusion die, whereby under the influence of the $CO_2$ gas a closed-cell structure is obtained with a density of less than 0.032 g per cubic centimeter. Owing to this structure, the thus obtained product has elastic properties and permits of rapid biological decomposition.

A disadvantage of this known method is that the raw materials are to be supplied in relatively dry form and in the extrusion tank, are to be mixed with water under simultaneous increase of the temperature in the tank, whereby the desired gelatinization occurs. To that end, the mixture must be heated, which is difficult to effect homogeneously in view of the relatively large mass. As a consequence, the process is relatively poorly controllable. A further disadvantage is that the products obtained in this way have only limited durability and are not water-resistant and moreover are not particularly dimensionally stable. As a result of the extrusion process and the strong expansion occurring after the extrusion, the freedom of design in this method is limited.

European patent application 0 118 240 discloses a method for manufacturing biodegradable medicament capsules and like products by injection-molding from a starch composite. To that end, a starch mixture with a low water content is introduced into a closed space, in particular the hopper of an injection-molding machine, where plasticization of the mixture is provided for at a suitable specific temperature, pressure and humidity. The temperature and pressure are increased to such an extent that the mixture is adjusted to above the vitrification point. Thereafter the plasticized mixture is forced into a cold mold and maintained under pressure, until the, or each, product has cooled off sufficiently, whereafter the mold is opened and emptied.

The advantage of this known method is that dimensionally stable biodegradable products can be manufactured relatively fast. However, the possible dimensions of products that can be manufactured with this method are limited, owing to the flow path in the mold. In fact, the plasticized mass forced into the mold is cooled directly, which gives rise to solidification and prevents flow into the mass relatively soon after entry of the mold. Moreover, no cross-linking of the starch in the mass occurs, so that the products have relatively weak strength properties and exhibit relatively poor resistance to water and moist conditions in general. In a moist environment the products will take up a great deal of water and thereby become slack; conversely, in a dry environment moisture will evaporate from the products, so that they become hard and brittle. The products obtained with this method have a high density and have no foamy structure.

European patent application 0 407 350 proposes an improved composition of starch composites for use in inter alia a method according to the above-described European patent application 0 118 240, by which, for instance through casting or extrusion, products can be manufactured with better strength properties and better resistance to different conditions, in particular as regards humidity and temperatures. To that end, to the composite of starch, a thermoplastic plastic is added, whereafter the mixture is transformed under very well regulated and controlled conditions into a melt allowing subsequent casting or extrusion. By controlling the conditions, it can be ensured that the thermoplastic plastic melts and mixes with the starch without the starch disintegrating.

An advantage of this known method is that the products are dimensionally stable, have good strength properties and exhibit relatively good resistance to humidity and temperature fluctuations. One of the disadvantages of this known method is that the thermoplastic plastic must be added. This reduces the biodegradability and it is less attractive from an environmental point of view. Further, these products too have a relatively high density. Moreover, when using the composite for injection molding, the above-mentioned drawbacks remain, such as, for instance, the laborious and costly preparation of the composite, the limited possibilities as regards dimensioning and the absence of cross-linking of the natural polymers.

International patent application 95/04104 discloses a method for manufacturing foamed, biodegradable products from starch-containing raw materials, in which an amount of starch is liquified in a pre-stage by heating to a temperature far above the gelatinization temperature, whereafter an amount of water-saturated ramie fibers is admixed. This mixture is thereafter passed into or through a mold or converted to a dry granulate. Upon heating of the mixture, the water is to escape from the ramie fibers and to function as blowing agent. When using this known method, a substantially dry granulate of starch is to be strongly heated in the pre-stage, which granulate therefore cannot form a liquid batter. Accordingly, this method suffers from the above-mentioned disadvantages of the gelatinization of the mass prior to its introduction into the mold, such as for instance the laborious and costly preparation of the composite, the limited possibilities as regards to dimensioning.

International patent application 92/13004 discloses a method for manufacturing solid and foamed, biodegradable products from starch-containing raw materials. In this apparatus, an amount of moist (20% water) starch is mixed with inter alia some water and mixed in a heated vat in order to obtain gelatinization of the mass, whereafter it is processed through an outlet opening into film or sheet. Thereupon, the film can be deformed into, for instance, dish products. In this known method too, the liquidity of the suspension to be processed is obtained by heating the mass, to above the vitrification temperature prior to the definitive processing. Moreover, to the heated mass an amount of steam or alcohol vapor is added. The processing means (for instance rollers) are maintained at a relatively low temperature (70° C.). Further, European patent application 0 634 261 discloses a method for manufacturing biodegradable products utilizing a kind of injection-molding technique, which starts from a mixture of a first and second biodegradable starting material. The first has a melting temperature of above 100° C., the second of less than 100° C. Either a substance which contains water is added to the starting material, or water is incorporated in the starting material, in such a manner that it can provide for the blowing of the cells. In an extruder press, the mass is heated to above the gelatinization temperature of at least the first starting material, mixed and pressurized and subsequently sprayed into a mold cavity provided in a pressurized space. After introduction of the mass, the pressure is removed, so that the water in the mass expands, blows the cells and exits through the permeable wall of the mold cavity. Such a method requires a complicated composition of starting materials, which moreover are not entirely biodegradable. Further, this known method has the above-mentioned disadvantages resulting from the gelatinization of at least a part of the mass prior to its introduction into the mold, such as for instance the laborious and costly preparation of the composite, the limited possibilities as regards to dimensioning. In particular, as a result of inter alia the porous walls, the outer wall portions of the products manufactured according to this method will not have a dense, compact wall but a uniform distribution of cells of uniform size throughout the product thickness.

SUMMARY OF THE INVENTION

The object of the invention is to provide a method for manufacturing biodegradable products, in which the supply of the starting material is simple, in which the manufactured products are simple to remove from the mold, which allows a relatively great freedom in design and whereby the manufactured products have a good dimensional stability and exhibit relatively good resistance to different conditions, including moist environments and temperature fluctuations. In particular, the invention relates to a method for manufacturing biodegradable products with a blown, foamy structure, wherein a mass comprising at least natural polymers such as starch is passed under pressure into or through a mold and the mass is heated in the mold, in a manner such as to give rise to gelatinization and crosslinking of the natural polymers, while the mass prior to the introduction into the mold has a temperature which is below the gelatinization temperature and in the mold is maintained at least for some time at a temperature which is above the gelatinization temperature.

Owing to the supply of the mass from which the or each product is to be formed at a temperature which is below the gelatinization temperature, the supply of the mass can be realized in a simple manner, for instance via pumps and pipes. Moreover, a stock of the mass can be previously prepared and be fed to a processing apparatus directly from a storage tank. By subsequently passing the mass under pressure into or through the mold and only heating it in the mold, it is ensured that the mold is always filled sufficiently. The flow path, that is, the, or each, path traversed by the mass to and in the mold can then be long to very long with respect to the cross sections of the passages. Only in the mold does the, first gelatinization of the natural polymers occur, and then the cross-linking of those polymers.

Due to the cross-linking that occurs, a firm product is obtained. A natural polymer provides for a relatively firm skeleton which extends around preferably continuous cells that form in the mold due to moisture or other blowing agents which, as a result of the heat in the mold and the pressure therein, attempt to escape from the mass and thereby form bubbles. As a result, the product obtained has a blown foamy structure. Since the natural polymer provides for a relatively stiff jacket, the thus obtained product is dimensionally stable upon exiting from the mold. Depending inter alia on the extent of cross-linkage, the product obtained is more or less flexible.

Since the mold is heated and not the mass prior to being forced into the mold, the temperatures in the mold can be properly controlled, both for the mold as a whole and for each separate portion thereof. As a result, products can be manufactured with different and varying wall thicknesses and with different mechanical properties. In fact, by heating more or less and/or for a longer or shorter period and adjusting, for instance, the pressure, for instance the extent of cross-linkage of the polymers can be controlled locally, so that the mechanical and physical properties are influenced. All this can be simply determined by those skilled in the art.

In an advantageous embodiment, a method according to the invention is further characterized by the fact that the cells substantially have a wall of natural polymers cross-linked during heating, while the cell size across the wall thickness of each product is varied, such that it decreases in outward dimension.

By controlling the process conditions, in particular the feed rate of the mass, the temperature of the mold and the pressure in the mold, a product is manufactured in which the cells are smaller adjacent the mold wall than centrally between the walls of the mold. In other words, in the product, the cell size increases from the inside to the outside. Thus, a relatively closed, water-tight skin is obtained which properly protects the product from premature decline, while the inside of the product comprises relatively large cells which can keep the product light and flexible. A further advantage of the skin with a relative large density is that, as a result, a taut and smooth surface is obtained which affords the product an agreeable appearance, has a pleasant feel, is simply removable from the mold, is simply printable and moreover hygienic. Accordingly, in contrast with the known methods, a cell structure is obtained which is non-homogeneous, at least viewed across the wall thicknesses.

In a further advantageous embodiment, a method according to the invention is characterized by products formed with a number of sheet, bar, or dish-shaped parts, each having, in at least one direction, a dimension that is relatively small with respect to the total dimensions of the product.

By building up the products according to the invention from dish or sheet parts, each having at least one slight thickness with regard to the other dimensions, at least with regard to outside dimensions, voluminous products can be manufactured which can yet be supplied at all points with so much heat during the preparation that the desired extent of cross-linkage occurs. Thus, dish-shaped products can be manufactured, that is, also block-shaped products, with, for instance, a recess in which a product to be packaged can be wholly or partly received, and filler blocks for, for instance, packages, can be manufactured. Also, for instance through extrusion, for instance hollow or finned profiles can be manufactured. A further advantage of the relatively thin sheet parts is that, as a result, relatively great flexibility is obtained while the products maintain the desired strength properties and volumes.

In a first preferred embodiment, a method according to the invention is characterized by the mass being formed by a liquid batter, comprising a suspension or solution(s) of at least the natural polymers, such as starch, in a liquid.

By using a batter which is liquid below the gelatinization temperature, preferably at room temperature, the batter can be supplied in a simple manner, for instance via pipes and using simple pumping means. Moreover, a stock of the batter can be previously prepared and be fed to a processing apparatus directly from a storage tank. In this connection, the liquidity of the batter provides the advantage that the flow path in the mold is particularly long. The water in the batter functions as blowing agent and moreover, upon evaporating from the mold, provides space for the expansion of the cells.

The batter preferably consists entirely of biodegradable constituents, in particular, in the form of a suspension. As a result, good flow properties of the batter are maintained and crude starting material such as starch can be used, for instance potato starch or tapioca. Moreover, such a suspension can be simply stored, at least better than a mixture already gelatinized.

In Dutch patent application 9300102, incorporated herein by reference, a number of examples of such batters are described. These batters comprise 500–1500 parts by weight of starch or starch derivatives, 0.5–50 parts by weight of xanthan gum, 5–250 parts by weight of a reactive siloxane and 25–300 parts by weight of an inert filler in water. Additionally, preferably 0.5–50 parts by weight of a salt are further included. However, the embodiments described should not be construed as limiting in this respect When other batter compositions are used, the processing conditions, such as pressure, temperature and time, will often have to be adjusted.

Mentioned as suitable natural polymers are native starch, for instance potato starch, maize starch, wheat starch, waxy maize starch, tapioca starch, pea starch, high-amylose starch or rice starch. Preferably, however, potato starch is used, whose amolypectin content can vary between 75 and 100%. Starch derivatives can also be used, for instance, starch which has been modified by etherification, ester-4 cation, acid hydrolysis, oxidation, cross-linking -and/or the action of enzymes.

In an alternative embodiment, a method according to the invention is characterized by introducing the mass into the mold in a relatively dry condition, preferably in granulate form. Before being introduced into the mold, the mass is slightly prefoamed without this giving rise to gelatinization.

The use of relatively dry, optionally slightly prefoamed starting material provides the advantage that relatively little water or other moisture needs to evaporate in the mold, which has appreciable energetic advantages, the more so since the mass only needs to be heated in the mold, not in the pre-stage. The mass can for instance consist of granulate material, in particular more or less spherical particles having small to very small dimensions with respect to the passage openings to and in the mold. This granulate material can contain a blowing agent, for instance in the form of water or blowing agents simply released and/or evaporating upon heating, such as bicarbonates, which provide for gas evolution through decomposition at elevated temperature.

As starting materials, for instance, the natural polymers mentioned in respect of the batter can be used.

In a further advantageous embodiment, a method according to the invention is characterized in that as mold an injection mold is used.

By using an injection mold in a method according to the invention, products can be manufactured with both regular and irregular shapes, which are dimensionally stable and can have varying wall thicknesses. Products manufactured in this manner can, for instance, be used as sheet and dish parts, trays and boxes and like dish-shaped packages and as filler for, for instance, packaging products in boxes and the like. One of the important advantages that can be achieved with this method is that a greater freedom in design is obtained than when platen sets are used. The products can be manufactured in withdrawable as well as non-withdrawable manner, since divisible cores and the like can be readily utilized. As a result, for instance undercuts can be integrally molded. Moreover, greater differences in height can be incorporated in the product in that the flow path can be longer and gravity has no influence, at least no appreciable influence, on the distribution of the mass.

In a further advantageous embodiment, a method according to the invention is characterized in that an extrusion die is used. When using an extrusion die in a method according to the invention, biodegradable sections and the like can be manufactured in a simple manner with the above-mentioned advantages of the cross-linked structure of the natural polymers. Owing to the mass being supplied in cold, preferably liquid form, the preparation thereof is particularly simple and products with the desired properties can be manufactured in substantially one processing pass. In this manner, for instance, sheets and sections can be extruded which are used in great lengths or can be divided up and, for instance, be used as loose filler in the packaging of products in boxes, crates, bags and the like. Extrusion and the use of an extrusion die should herein be understood to mean, in particular, forcing a molding mass under pressure through a relatively small orifice, this orifice determining substantially at least one cross section of the product. The delivery pressure can, for instance, be generated with a pump or a plunger.

Products that are manufactured with a method according to the invention can in a general sense be designed light with respect to the volume, have sufficient strength and elasticity and are properly resistant to different conditions, in particular when using a "skin" with a relatively high density and a core with a relatively low density.

During the manufacture of the products according to the invention, gas formation through evaporation of water or under the influence of blowing agents occurs so fast that foaming occurs concurrently with, or preferably before the gelatinization. At elevated pressure and/or temperature this effect is achieved, while further more solid material is "compressed" as cell wall. This not only yields a core made up of large cells with firm cell walls but also skin layers with a higher degree of densification of firm small cells.

In addition, there may be a number of other conditions that must be met to obtain the desired result.

The colloidal particles and corresponding conditions must meet requirements to provide for forming foam, which requires, among other things, a particular load and particular surface tensions, in conjunction with an internal and external pressure in the foam bubbles.

The charging of the mold cavity must be complete within a very short time, which entails requirements for the "flow" properties and the thrust: during this short period the "flow" properties must remain sufficient to ensure complete filling, while the driving force, the propellant or "foam" gas, must remain present in a sufficient, amount to advance the mass (which is increasingly hard to move). Flow should herein be understood to include both the flow of a liquid, such as the liquid batter, and the flow of a granulate-form, relatively dry substance such as small rolling and sliding granules or powder, whether or not in slightly prefoamed form. Accordingly, the length of the flow path is at least dependent on the liquidity of the starting material and, given equal conditions, will be greater for a liquid or suspension than for granulate material. Moreover, the length of the flow path will be positively influenced by a greater difference between the low supply temperature and the temperature of the mold during the baking.

The invention further relates to apparatuses suitable for use in a method according to the invention.

The invention moreover relates to biodegradable products manufactured with a method and/or in an apparatus according to the invention.

BRIEF DESCRIPTION OF THE DRAWINGS

To clarify the invention, exemplary embodiments will be described with reference to the drawing.

FIG. 1 shows a biodegradable product, in particular a filler block, manufactured by injection molding, in perspective view with a part broken away.

FIG. 1a shows, on an enlarged scale, twice a cross section of a wall of a product according to FIG. 1.

DETAILED DESCRIPTION

Figure 2:
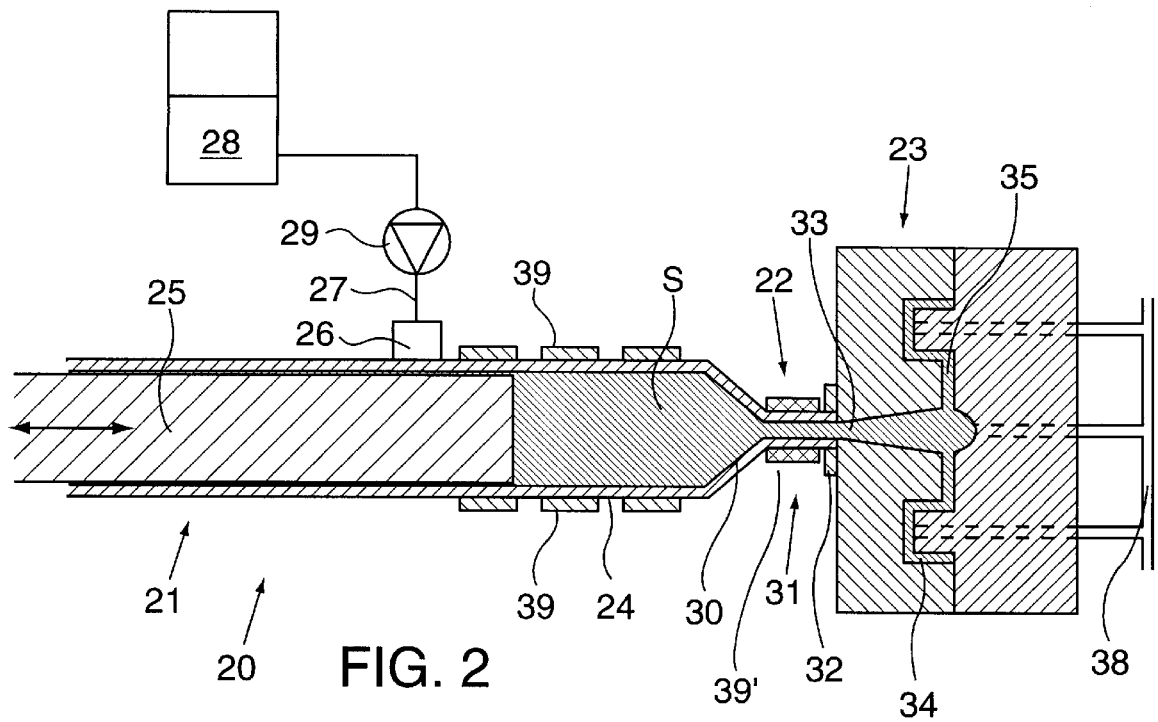
FIG. 2 schematically shows in cross-sectional view an injection-molding apparatus according to the invention.

The product shown in FIG. 1 is a filler block 1, for instance suitable for locking a housing of a computer C in a box D with a proper fit. The computer C and the box D are schematically represented in broken lines and are mentioned only by way of example. The filler block 1 consists of a body 2 and a number of first 3 and second ribs 4 extending downwards from the body 2. The first 3 and second ribs 4 extend approximately at right angles to each other. Enclosed between two first ribs 3, two second ribs 4 and the body 4 is a cavity 5 of approximately rectangular cross section. The overall dimensions (length L, width B and height H) of the filler block 1 are large with respect to the amount of material used, and hence with respect to the weight, is light when compared with a comparable solid block of the same material.

The first ribs 3 have a first part 6 which is relatively high with respect to a second part 7 thereof. The second ribs 4 likewise have a first part 8 which is relatively high with respect to the second part 9 thereof. The relatively high parts 6, 8 are arranged together, as are the relatively low parts 7, 9. The low parts 7, 9 thus define an imaginary bottom surface 10. The approximately vertically extending transition parts 11 between the high parts 6 and 8, respectively, and the low parts 7 and 9, respectively, define two imaginary wall surfaces 12 which include an angle with each other and with the bottom surface 10. The bottom surface 10 and the wall surfaces 12 define an imaginary space in which, for instance, a corner of the computer C can be received.

When the computer C is accommodated in a box D, the filler block 1 is received between the computer C and three wall panels of the box D with a proper fit. Preferably, such filler blocks 1 or comparable, suitably shaped filler blocks 1 are fitted between the computer C and the box D at several points, so that the computer C is prevented from shifting and moreover a shock-absorbing capacity is obtained, so that damage is avoided. It is noted that the ribs can be arranged in various orientations and positions with respect to each other and the body 2, and more or fewer (groups of) ribs can be used. Thus, for instance, the body can be arranged on the side proximal to the product to be accommodated, so that a greater contact surface between the product and the filler block is obtained. In addition, cavities 5 can be open in different directions, or at least locally all or some ribs can extend in one direction only and, for instance, have a meandering, sinusoidal or otherwise bent shape. Further, openings and recesses can be provided in the ribs and/or in the body. These and many ocher modifications are considered to fall within the scope of the invention.

The filler block according to FIG. 1 is preferably manufactured by injection molding in a mold as will be further described hereinafter. The manufacture of the filler block 1 will be described starting from a batter S which comprises at least biodegradable polymers. The batter is preferably a solution or suspension, and in particular a suspension of starch or one or more of such natural polymers in water. As will be further described hereinafter, it is also possible to start from a relatively dry starting material, for instance granulate material, and other compositions can also be used. A choice for a batter or, for instance, granulate material, can for instance be made depending on the desired supply means, desired energy consumption, flow paths in the mold and in the feed track, availability of starting materials and the like. In this description, "gelatinization" is intended to refer to a change of a natural polymer from a slightly or completely loose granular or comparable granulate form into a dry or non-dry and/or foamed cohesive form, in which stretched polymers are present which are mutually bonded to a limited extent only, if at all. That is to say, a transition occurs from a solid substance, a colloidal solution or suspension to a more homogeneous fluid mass.

The batter is liquid at room temperature and slightly above that, at least below the gelatinization temperature of the polymers or at least the greater part thereof, which renders it easy to process, since the suspension has a good flow behavior and can simply be pumped. This provides the additional advantage that the polymers are not damaged during supply, for instance by an extrusion press screw. Moreover, such a suspension can be manufactured and preserved in a simple manner. A further advantage is that it is entirely biodegradable and that starch is a raw material which is simple to obtain, cheap, and present in abundance, which, moreover, in contrast with, for instance, products based on mineral oil and the like, is continuously replenished. The water at low temperatures serves as solvent or suspending agent and as liquifier and, upon strong heating, as blowing agent. As desired, additives can be added to the suspension, such as for instance emulsifiers, liquifiers, other blowing agents and coloring and flavoring substances. Further, for instance thermoplastic plastics can be added in relatively small amounts, for instance for a further improvement of the strength properties or for a further improvement of the resistance to moisture and temperature influences or to wear.

In an alternative embodiment, the starting material is a substantially dry, granulate-form mass M, which will be further explained hereinafter.

FIG. 2 schematically represents an injection-molding apparatus for use with a method according to the invention, together with a mold suitable for the manufacture of a product according to FIG. 1.

The injection-molding apparatus 20 comprises a supply device 21 for a batter S, a spray nozzle 22 and a mold 23. The supply device 21 comprises a cylindrical wall 24 with a plunger 25 movable therein with a proper fit. At a first end, the cylindrical wall 24 connects to the spray nozzle 22, and remote from the spray nozzle 22 a supply opening 26 is provided in the wall 24, to which a supply pipe 27 for batter is connected. The batter S is for instance supplied from a storage tank 28 utilizing a pump 29.

The spray nozzle 22 consists of a conically shaped first part 30, tapering in the direction away from the wall 24, and a second part 31, connecting thereto, of circular cross section, which second part 31 is narrow with respect to the cylindrical wall 24. Via a thermally separating connecting piece 32, the second part 31 connects to a gate 33 of the mold 23. Further included are means, not specifically shown in the drawing, for shutting off the supply opening 33, after the introduction of a suitable amount of batter into the mold. These means can, for instance, be part of a plunger 25 or be formed by valve means or the like. The thermal separation between the supply means and a mold and the, or each, product to be formed therein should be maintained by these means.

Figure 2A:
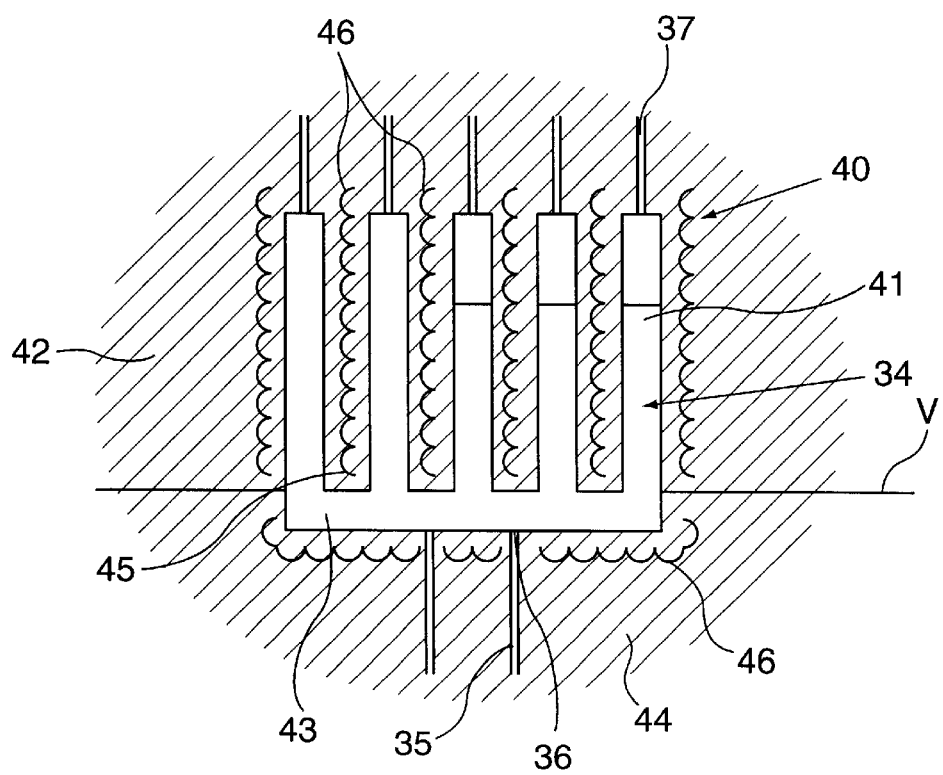
FIG. 2a shows on an enlarged scale a part of a mold, with mold cavity, in cross-sectional view.

Provided in the mold 23 are a number of mold cavities 34, which will be further described hereinafter and two of which are depicted. Different numbers of mold cavities can be provided, which are identical or different. The mold cavities 34 are connected to the gate 33 via mold channels 35 (FIG. 2A). Connecting to the, or each, mold cavity 34 at a point remote from the mouth 36 where the relevant mold channel 35 opens into the mold cavity 34 are one or more deaeration channels 37 which are in communication with the environment. This communication is preferably free, but may also be adapted to be shut off, for instance by a pressure relief valve. The mold 23 is suitably divisible along a plane V which intersects the, or each, mold cavity, in such a manner that products formed in the, or each, mold cavity can be simply removed therefrom. Further, for the, or each, mold cavity 34, withdrawal or eject means 38 may be provided for pushing clear the products formed.

Arranged around the cylindrical wall 24 are means 39 for cooling the batter S. Cooling should herein be understood to mean maintainance at a temperature which is below the temperature at which gelatinization of the natural polymers in the batter occurs. These cooling means can, for instance, consist of coolant-conveying pipes 39. Such cooling means 39, are likewise arranged around the spray nozzle 22. The mold 23 is entirely and/or locally heated utilizing heating means 40 incorporated therein. The thermally separating connecting piece 32 contributes to a thermal uncoupling of the supply device 21 and the mold 23. Cooling of the section 21, 22 of the apparatus upstream of the mold 23 prevents the occurrence of gelatinization, cross-linkage or chemical change in the suspension in the supply device, which would adversely effect the flow properties thereof in particular.

The mold 23, of which FIG. 2a shows a part with a mold cavity 34 on an enlarged scale, contains different heating means 40. In the exemplary embodiment shown, the mold cavity 34 is defined by a number of slotted recesses 41 intersecting each other approximately at right angles, in a first part 42 of the mold 23, and a trough-shaped hollowing 43 in a second part 44 movable against the first part 42 of the mold. The depth of the hollowing 43 is small with respect to the width and the length thereof; the width of the recesses 41 is small with respect to the depth and the length thereof. When the first part 42 is clamped against the second part 44, the mold cavity defines a space corresponding with the shape of the product according to FIG. 1.

In the projections 45 formed between the recesses 41, a heating element 46 is included, for instance an electric heating element. It is noted that the mold parts can also be heated indirectly. On the side of the hollowing 43 remote from the dividing plane V, likewise heating elements 46 are included. The temperature of the different heating elements is preferably controllable individually, but several or all heating elements may also be coupled. In addition, the mold can be heated externally from one or more sides, for instance electrically or by steam or gas burners. Through the heating elements 46 and optional other means, the temperature of the mold can be raised in such a manner that in the mold cavity 34 during use, as desired, at all times and at all points the desired high baking temperature is achieved and maintained.

The injection-molding apparatus according to FIGS. 2, 2a can be used as follows.

The mold parts 42, 44 are clamped against each other and the eject means 38, if any, are set in the rearmost position, outside the mold cavity or mold cavities 34. The plunger 25 is moved in the direction away from the spray nozzle 22, beyond the supply opening 26. As a result, the supply opening 26 is cleared and the interior of the supply device 21 and the spray nozzle 22 are filled with batter S. The cooling means 39, 39' and the heating means 40, 46 are switched on in such a manner that the different parts are adjusted to the desired temperature and so maintained. To that end, the temperature can be maintained constant or be varied during the baking and/or cooling time. The plunger 25 is moved forwards over a short distance, so that an amount of batter is pressed into the mold and into the mold cavities 34 under high pressure, whereafter the gate 33 is shut off, under a suitable thermal separation. In the mold cavities 34 the batter is brought to the desired temperature, for instance between 150° C. and 250° C., and maintained at that temperature for a "baking time" of, for instance, 2 minutes. As a result, gelatinization and subsequent crosslinking of the (natural) polymers occurs. In addition, the strongly heated water and/or other liquids evaporate from the batter, thereby forming bubbles. In the batter, bubbles are formed which are partly encapsulated by the cross-linked structure. This yields a foam structure, which can be further enhanced by adding extra blowing agent. In order to allow substantially all of the evaporating moisture to escape from the mold, a sufficiently large number of vents are provided. After the baking time, the mold 23 is opened in two or more parts and the products are taken from the mold cavities 34 or pushed out of them using the ejectors 38.

Upon heating of the suspension to a temperature above 62° C., and at least above the gas formation or vaporization temperature of the or a blowing agent, within the suspension gelatinization of the starch, bubbles form as a result of evaporation of the water. Upon further heating of the suspension, cross-linking of the polymers occurs, yielding a firm, relatively dense structure around cells that result from the evaporation of the water and optional other blowing agents.

The injection-molded product has an at least substantially closed skin 13 of closed cells and a foamy core 14 which comprises open cells 15. In FIG. 1a, on an enlarged scale, twice a cross section through one of the ribs 3 is shown, on the left in a highly schematic representation, on the right in a more realistic form. The closed skin 13 provides for a good resistance to external influences, such as for instance moisture and temperature, while the core 14 provides, among other things, for a large volume combined with a relatively small weight and for good resilience. Further, the skin 13 has a rigidity- and strength-enhancing effect. The walls 14', as a result of the baking, have a firm skeleton.

The skin is dimensionally stable and has a smooth and taut appearance, which is esthetically advantageous and moreover enables, for instance, its being printed on, as well as the provision of relief using the, or each, mold cavity.

As long as the skin 13 remains closed, biodegradation of the product is adequately prevented or at least slowed down to a great extent. Through a suitable choice of the temperature build-up and the pressure build-up in the mold cavity, the properties of the product can be influenced, for instance in that the skin 13 is thinner or thicker with respect to the core 14 and in that the core 14 and the skin 13 are cross-linked to a greater or lesser extent ("well-done"). By varying of the temperature in time and/or in the different parts of the mold, and in particular by changing the temperatures of the different projections 45, the properties of the different parts of the product can be changed, so that, for Instance, the elasticity of the parts can be different.

In contrast with the known method In which platen sets are used, with injection molding, first the mold cavity is closed and only then is the batter introduced into the mold. As a consequence, the total volume of the mold cavity can be greater than the volume of the separate mold cavity parts as contained in the mold's first 42 and second part 44, respectively. In fact, in the known method, the batter is to be introduced into a cup-shaped cavity and held therein until the mold is closed. When the mold is being closed, the batter moreover cannot be allowed to be pressed away across the edges because it will then flow between the land areas and prevent closure of the mold or at least render it more difficult. In the known method, therefore, the total volume of the closed mold cavity should be considerably smaller than the volume of the cup mold, which moreover initially includes all of the 5 moisture which subsequently evaporates.

Figure 3:
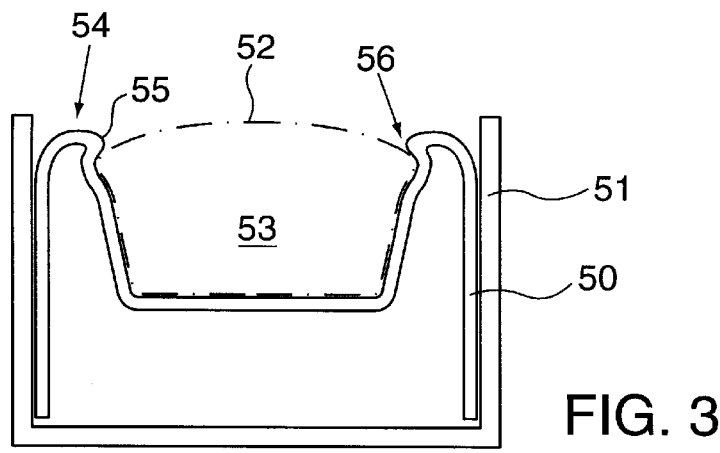
FIG. 3 shows a biodegradable product, in particular an insert tray for a storage box, manufactured by injection molding, in cross section.

FIG. 3 shows a cross section of an inner tray 50 in a storage box 51, in which inner tray 50 for instance a household appliance 52 can be accommodated. The inner tray 50 is dish-shaped, that is, at least for the most part thin-walled, and has a receiving cavity 53. Situated adjacent the upper edges 54 of the receiving cavity 53, on opposite sides, is a clamping projection 55 which is formed integrally therewith and has an undercut 56 under which the shaver 52, which is shown in broken lines, can be pressed down. The inner tray has been formed by injection molding, utilizing a divisible core. As a consequence, the clamping projections 55 can be integrally injection molded. Accordingly, the method according to the invention also enables the manufacture of biodegradable, non-withdrawable products in one processing pass, which renders such products particularly suitable, for instance, as packaging material, storage material and the like, but also as filling material, for instance for sandwich-shaped construction parts, for housings and the like.

Figure 4:
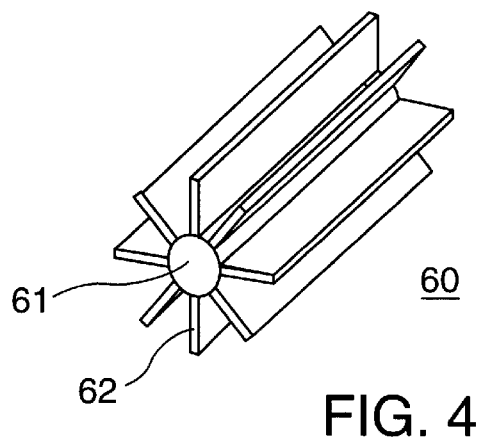
FIG. 4 shows a biodegradable product manufactured by extrusion, in perspective view.

FIG. 4 shows a filler product 60, in the form of a so-called "loose fill material", a filler product 60 which is used for packaging products in a shock-absorbing manner in, for instance, boxes, cases, crates or like packages. To that end, a multiplicity of the filler products 60 are loosely poured into the space between a product (or products) to be packaged and the package, whereafter the package can be closed and movements of the packaged product within the package are prevented or at least accommodated in a shock-absorbing manner. To that end, the loose fill material is slightly elastically deformable.

The filler product 60 as shown in FIG. 4 comprises an approximately cylindrical core 61 and a number of fins 62 extending approximately radially from the core, and which extend throughout the length of the core. The fins are relatively thin with respect of their height and length, so that they exhibit a measure of bending slackness. The circumference of the filler product 60, measured along the tops of the fins 62, is largely determines of the volume the filler product occupies, so that a favorable volume-to-weight ratio is obtained.

Figure 5:
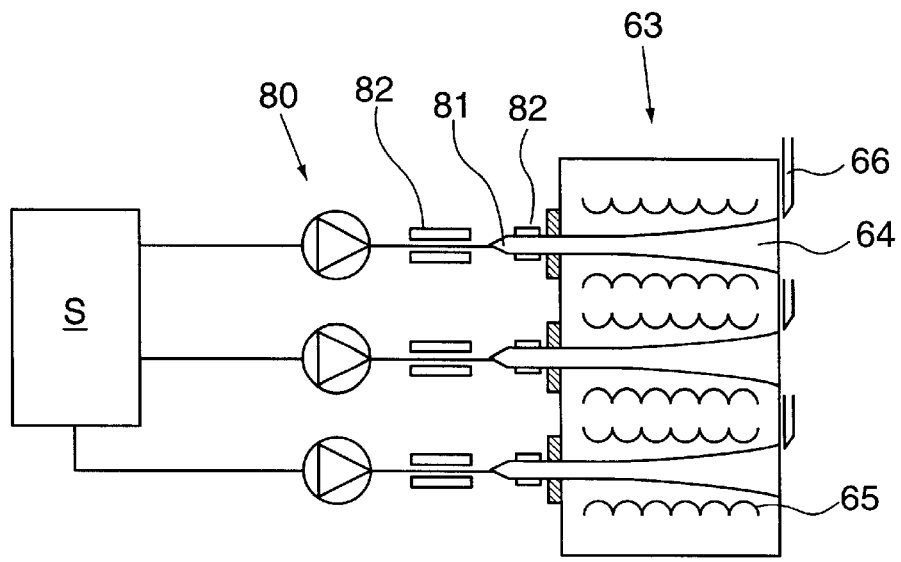
FIG. 5 schematically shows in cross-sectional view an extrusion apparatus according to the invention.

The filler products according to FIG. 4 and similar for instance lengthwise symmetrical products can be formed by extrusion on an apparatus according to FIG. 5. The extrusion apparatus comprises a supply device comprising means 80 for the (semi) continuous pressurized supply of batter S for a granulate-form mass M, whether or not pre-foamed to some extent, from a storage tank to a spray nozzle 81, for instance utilizing one or more pumps. Connecting to the spray nozzle 81 in this extrusion apparatus is an extrusion die 63 which comprises one or more extrusion orifices 64 of a cross section which substantially corresponds to, at least is similar in shape to, the cross section of the filler products to be obtained. The supply device 80, and in particular the spray nozzle 81 are provided with cooling means 82, for instance as described in the foregoing.

The extrusion die comprises heating means 65 which are arranged in such a manner that at least in the extrusion orifices the temperature can be accurately controlled, for instance to 150° C. to 200° C. Arranged on the side of the extrusion die 63 remote from the supply device 80 is a cutter 66 by which extruded sections can be cut into short lengths upon exiting from the extrusion orifices.

The apparatus according to FIG. 5 can be used as follows.

From the supply device 80, a continuous flow of batter S or a mass M in granulate form, whether or not in a slightly pre-foamed condition, is fed via the spray nozzle 81 to the heated extrusion die 63 and forced through the, or each, extrusion orifice 64. The leading part of the batter gelatinizes and proceeds to cross-link, whereby the moisture evaporates from the batter and causes the product to foam, optionally together with additional blowing agents and other additives. Preferably, the cross section of the, or each, extrusion orifice 64 widens slightly in the direction of extrusion, in such a manner that during the foaming of a product, as the baking batter S is being passed through the extrusion orifice, the pressure that is exerted on the filler product 60 is sufficient to obtain the desired skin and core properties, without the cross-linked structure thereof being broken or otherwise damaged by the extrusion die.

As a result of the continuous supply of batter, the "baked" part of the extruded section is pushed forward, in such a manner that it leaves the corresponding extrusion orifice 64. On the leading side, each time a part of the section is cut off, whereby the cut surface is closed. in this manner, at a relatively high rate and at relatively low cost a large amount of loose fill material can be manufactured from a liquid batter. These filler products are biodegradable or sections in great 5 lengths, and may also be in sheet form, for instance.

When the batter is liquid, preferably in the form of a solution or suspension, manufacture, storage, transport and dosage thereof are particularly simple and in a method according to the invention use can be made of a simple apparatus, which renders these methods relatively cheap. Further, in most embodiments the natural polymers need not be subjected to any expensive pretreatments before they can be used. They only need to be included in the batter.

In the foregoing, methods and apparatuses have been described for manufacturing biodegradable products with a foamed structure using an injection-molding technique and an extrusion technique, the starting material being a liquid batter, in particular a solution or suspension. However, as indicated, it is also possible to start from a substantially dry mass consisting of, or at least comprising, for instance, a granulate material. The granulate material can, for instance, comprise more or less spherical particles having small dimensions with respect to the orifices in the molds and supply means. Like a liquid, these particles can display a certain flow behavior, as a result of which, under pressure of the supply means, they can fill the mold or be conveyed through it.

The particles which can contain, for instance, water or a different blowing agent in relatively small amounts, are heated after being introduced into the mold and will swell as a result, since the blowing agent present will blow up the particles, just as in the case of the particles included in the solution or suspension. With such a starting mass too, the polymers will provide for a high degree of cross-linkage and hence a firm cell wall of the blown cells. It is true of such a method too, that the mold as hot part together with the pressure and the blowing agent will lead to a high degree of densification of the outer parts of the walls of a product, the so-called skin, while the core will contain larger cells.

Due to the fact that in this method less moisture is included in the starting mass, relatively little energy is necessary therefor, in that less heat is needed for the evaporation. This is precisely what is of particular importance for the manufacture of biodegradable products, in view of the environmental advantages that can be achieved with such products. Partly as a consequence of relatively cheap raw materials and high production rates that can be achieved, thus a low-energy, environment-friendly and economically advantageous production method has been obtained for products that present few environmental problems, if any, also in the downstream stage, that is, as waste.

When a mass M in granulate form is used, of course a different flow behavior occurs than if a batter S is used. Moreover, not every starting material is suitable for use as or in granulate form, at least not advantageously so. Moreover, when using granulate material together with fillers, or combinations of granulate materials, it is sometimes not easy to prevent separation or to obtain and/or to maintain a good constant mixing.

For that reason too, products according to the invention are practical for use as packaging material, while moreover they do not present any problems regarding static charge.

In order to improve the appearance of the products, a colorant can be added to the batter or a surface layer can be formed, for instance through texture differences or by variation in temperature of the mold at different positions across the surface, so that local changes occur the skin as a result of different baking conditions. Naturally, it is also possible, after manufacture, to provide parts of the product with a coating, coloration or printing. Furthermore, it is possible to mold in, for instance, inserts in the product.

By way of illustration, examples are given of methods according to the invention, which should not be construed as being limitative in any way.

EXAMPLE 1

1000 g potato starch was introduced into a Hobart mixer and under stirring at low speed (position 1) successively 2 g Kelzan S, 2 g hydroxyl apatite, 75 g China clay Spes and 75 g Hydrocarb 90 were added thereto. After all components had been added, mixing occurred for another 15 minutes (position-1). This mixture was introduced into a previously measured and stirred composition of 1150 g mains water and 22 g silicone HY oil. After all components had been stirred (position 2) to form a liquid batter, this was introduced into a supply device of an adapted injection-molding machine. The injection-molding machine used is of the type EPS-10, of the firm Thermoware of Barneveld. The injection-molding machine used comprised a mold with ten mold cavities for forming trays, each tray having a size of 150*75*25 mm (L*B*H) and a wall thickness of 2.5 mm. The injection mold comprised electric heating elements and a plunger-injection device with a shut-off thermally uncoupled from the mold. Per mold cavity, approximately 15 cc batter was injected under a pressure of 2 bar and at a temperature of 20° C. The mold was heated to 210° C., with a temperature tolerance of between 200° C. and 240° C. and the mold was closed with a force of 5 kN per mold cavity. The mold was closed for 120 s and maintained at the required temperature, so that each mold cavity was filled entirely with foamed product. During heating, 98% of the water escaped, substantially in the form of vapor, via vents in the mold, with the water functioning as blowing agent. After 120 s the mold was opened and the injection-molded products were pressed from the mold cavities using the ejectors. The thus formed products were directly ready for use. Each product had a core of a thickness of approximately 2.1 mm, covered on opposite sides by a skin of a thickness of approximately 0.2 mm. Each product had a moisture content of approximately 1% and a weight of 8 g.

EXAMPLE II

A batter was prepared in the same manner as in Example I. At a pressure of 4 bar, this batter was continuously fed to an extrusion die with a star-shaped orifice of a cross section of 250 mm² and a length of 50 mm, which aperture was 150 mm long in the downstream direction. The die was heated to a temperature of 210°, so that approximately 95% of the water evaporated from the batter to form cells, while in the batter gelatinization and cross-linkage of the starch polymers around the cells occurred. Upon leaving the die, a section had been formed with a foam core, covered by a skin of a thickness of approximately 0.1 mm, the product formed being pushed out of the die by the batter being introduced. The thus formed section had a specific weight of approximately 150 g per dm³ and could simply be cut into short lengths for the formation of loose fill material.

EXAMPLE III

An amount of native starch in granulate form is introduced into a pretreatment apparatus. The granules have approximately a spherical shape with an average diameter of approximately 50 µm, each granule having a water content of approximately 20%. The granulate material is adjusted to a slightly increased temperature, whereafter a reduced pressure is provided for, in such a manner that the granules are prefoamed. During prefoaming the granules acquire a diameter of approximately 100–150 µm, while the water content decreases to approximately 10%. Using a pneumatic plunger system, 85 cc prefoamed granulate material with a density of approximately 100–180 g/l is forced into an injection mold. The injection mold has a trough-shaped cavity having the dimensions 190*125*18 mm with a wall thickness of 3 mm. The mold is kept closed with a force of approximately 5 kN per cavity and is subsequently heated to approximately 200° C. for approximately 40 s, which. results in gelatinization and cross-linkage of the natural polymers, while the water substantially evaporates from the granules, causing further foaming. The wall of the thus baked product has a core of open, blown and relatively large cells, while the outsides of the wall have a structure of compact, relatively small and substantially closed cells. The thus obtained tray is thereupon taken from the mold, is then dimensionally stable and has a water content of approximately 1%.

The invention is not in any way limited to the embodiments shown or described. Many variations are possible. The freedom of design which can be achieved with the methods according to the invention is virtually unlimited. Thus all kinds of other products can be manufactured with a method according to the invention, such as for instance trays for chips or snacks, edible containers such as ice-cream cups, sheet, bar and profiled material for all kinds of uses and many other comparable substantially thin-walled products. These and comparable variations are understood to fall within the scope of the invention.

What is claimed is:

1. A method for manufacturing biodegradable products with a blown, foam structure, wherein a mass including natural polymers is passed under pressure into or through a mold and the mass is heated in the mold in a manner such as to give rise to at least cross-linking of natural polymers to form a dense outside layer of a relatively thin rigid skin having closed, small cells, and a relatively thick foam inside core with open, larger cells, wherein the mass, prior to the introduction into the mold, is kept at a temperature whereby ungelatinized natural polymers in the mass are not gelatinized prior to introduction of the mass into the mold, whereby the mass which is below the gelatinization temperature is brought in the mold to at least the baking temperature to bake the product in the mold and form said relatively rigid skin, and wherein a relatively hard biodegradable product is formed with a blown, foam structure.

2. The method according to claim 1, wherein said larger cells of the product substantially form a wall of natural polymers cross-linked during heating, and wherein the cell size of said larger cells across the wall thickness of each product decreases in an outward direction.

3. The method according to claim 1, wherein each product is formed with a number of sheet, bar or dish-shaped parts, each having in at least one direction a dimension that is relatively small with respect to the total dimension of the product.

4. The method according to claim 1, wherein the mass is introduced into the mold in a relatively dry condition.

5. The method according to claim 4, characterized in that the mass, prior to the introduction into the mold, is slightly prefoamed without this giving rise to gelatinization.

6. The method of claim 4 wherein the mass is in granulate form.

7. The method according to claim 1, wherein a blowing agent, is included in the mass.

8. The method of claim 7 wherein the blowing agent includes water.

9. The method according to claim 1, wherein the mold is an injection mould.

10. The method according to claim 1, characterized in that the mold is an extrusion die.

11. The method of claim 1 wherein the natural polymers are starches.

12. A method for manufacturing biodegradable products with a blown, foam structure, wherein a mass including natural polymers is passed under pressure into or through a mold and the mass is heated in the mold in a manner such as to give rise to at least cross-linking of natural polymers, wherein the mass is a liquid batter comprising a suspension or solution of at least the natural polymers in a liquid and, prior to the introduction into the mold, the mass is kept at a temperature whereby ungelatinized natural polymers in the mass are not gelatinized prior to introduction of the mass into the mold, whereby the mass which is below the gelatinization temperature is brought in the mold to at least the baking temperature, and wherein a biodegradable product is formed with a blown, foam structure.

13. The method according to claim 12, wherein a batter is used which consists substantially entirely of biodegradable constituents.

14. The method of claim 12 wherein the natural polymers are starches.

15. A method for manufacturing biodegradable products with a blown, foam structure, wherein a mass including natural polymers is passed under pressure into or through a mold, wherein the mass is a batter of at least water and starch, and wherein the mold is heated to a temperature of more than 130° C., and wherein the mass is heated in the mold in a manner such as to give rise to at least cross-linking of natural polymers, and, prior to the introduction into the mold, the mass is kept at a temperature whereby ungelatinized natural polymers in the mass are not gelatinized prior to introduction of the mass into the mold, whereby the mass which is below the gelatinization temperature is brought in the mold to at least the baking temperature, and wherein a biodegradable product is formed with a blown, foam structure.

16. The method according to claim 15, wherein the mold is heated to a temperature between 150° C. and 200° C.

17. An apparatus for manufacturing biodegradable products from a mass, comprising:
   a) a mold which contains at least one mold cavity;
   b) a mass supply means for feeding said mass under pressure into the at least one mold cavity;
   c) a mold heating means for baking said mass into a relatively hard product by heating said mold and said mass to a baking temperature;
   d) a cooling means for keeping said supply means relatively cool with respect to said mold and for maintaining said mass disposed therein at least below the gelatinization temperature of said mass while said mold is at least said baking temperature of said mass; and
   e) means for thermally separating said mold and said supply means to maintain said mass in said supply means below said gelatinization temperature while said mold is maintained at least said baking temperature of said mass.

18. The apparatus according to claim 17, wherein the supply means include pumping means.

19. The apparatus according to claim 17, wherein the heating means include channels in the mold or die for passing therethrough a heated fluid.

20. The apparatus of claim 19 wherein the heated fluid is at least one of steam and oil.

21. The apparatus according to claim 17, wherein the heating means comprise electric heating elements.

22. The apparatus of claim 21 wherein the heating means are at least one of heating coils and induction heating means.

23. An apparatus for manufacturing biodegradable products from a mass, comprising:
   a) an extrusion die which comprises at least one extrusion orifice;
   b) a mass supply means for feeding said mass under pressure into and through the at least one extrusion orifice;
   c) a mold heating means for heating the die and baking said mass to form a product with a dense outside layer having a relatively thin rigid skin with closed, small cells, and a relatively thick foam inner core with open, larger cells; and
   d) a cooling means for keeping the supply means relatively cool with respect to the die and for maintaining said mass disposed therein at least below the gelatinization temperature while said extrusion die is maintained at least said baking temperature of said mass.

24. The apparatus of claim 23 further comprising means for thermally separating the extrusion die and the supply means.

* * * * *